US012313174B2

(12) United States Patent
Weidmann

(10) Patent No.: US 12,313,174 B2
(45) Date of Patent: May 27, 2025

(54) PRESSURE-RELIEF VALVE FOR REDUCING PRESSURE ARISING IN A CELL-LIKE CAVITY, SUCH AS A BATTERY CELL

(71) Applicant: HUGO BENZING GMBH & CO. KG, Korntal-Münchingen (DE)

(72) Inventor: Stephan Weidmann, Stuttgart (DE)

(73) Assignee: HUGO BENZING GMBH & CO. KG, Korntal-Münchingen (DE)

( * ) Notice: Subject to any disclaimer, the term of this patent is extended or adjusted under 35 U.S.C. 154(b) by 932 days.

(21) Appl. No.: 17/430,602

(22) PCT Filed: Jan. 28, 2020

(86) PCT No.: PCT/EP2020/051990
§ 371 (c)(1),
(2) Date: Aug. 12, 2021

(87) PCT Pub. No.: WO2020/164902
PCT Pub. Date: Aug. 20, 2020

(65) Prior Publication Data
US 2022/0146009 A1    May 12, 2022

(30) Foreign Application Priority Data
Feb. 12, 2019   (DE) ..................... 10 2019 103 431.0

(51) Int. Cl.
*F16K 17/04*     (2006.01)
*F16K 24/04*     (2006.01)
*H01M 50/333*    (2021.01)

(52) U.S. Cl.
CPC ...... *F16K 17/0413* (2013.01); *F16K 17/0493* (2013.01); *F16K 24/04* (2013.01); *H01M 50/333* (2021.01)

(58) Field of Classification Search
CPC ............ F16K 17/0413; F16K 17/0493; H01M 50/333
See application file for complete search history.

(56) References Cited

U.S. PATENT DOCUMENTS

2019/0280269 A1    9/2019   Weidmann

FOREIGN PATENT DOCUMENTS

| DE | 10 2011 109 310 A1 | 2/2013 |
| DE | 10 2013 016 668 A1 | 4/2015 |

(Continued)

OTHER PUBLICATIONS

European Patent Office, English language version of the International Search Report, Form PCT/ISA/210 for International Application PCT/EP2020/051990, Apr. 7, 2020 (2 pp.).

*Primary Examiner* — Basia A Ridley
*Assistant Examiner* — Heng M. Chan
(74) *Attorney, Agent, or Firm* — Pauley Erickson & Swanson

(57) ABSTRACT

A pressure relief valve for reducing pressure arising in a cell-like cavity, such as a battery cell, including a cover which has a seal for sealing a housing opening up to a predetermined cell pressure and is provided with a holding device in order to hold said cover on the housing opening, the holding device having a spring clip which is attached to the lower face of the cover that faces the housing opening and has a plurality of radially outwardly directed spring tongues which, at the ends thereof, are provided with spring portions which, when the cover is pressed onto the housing opening, can be moved back resiliently in the radial direction through the opening edge and, after passing through the housing opening, snap back under a wall region around the opening edge, wherein a bearing device, which is separate from the cover prior to mounting and to which the spring clip is fixed by a support part, is connected to the cover on (Continued)

the lower face thereof that faces the housing opening, a connection adapter being connected to the center of the bearing device, wherein a central opening of the spring is placed on the connection adapter and wherein the support part is connected to the connection adapter, thus fixing the spring clip.

30 Claims, 3 Drawing Sheets

(56) References Cited

FOREIGN PATENT DOCUMENTS

| | | |
|---|---|---|
| DE | 10 2014 111 041 A1 | 2/2016 |
| DE | 10 2015 011 663 A1 | 7/2016 |
| DE | 10 2016 121 605 A1 | 5/2018 |
| WO | WO-2018087136 A1 * | 5/2018 ......... F16K 17/0413 |

* cited by examiner

PRESSURE-RELIEF VALVE FOR REDUCING PRESSURE ARISING IN A CELL-LIKE CAVITY, SUCH AS A BATTERY CELL

BACKGROUND OF THE INVENTION

Field of the Invention

This invention relates to a pressure relief valve for reducing pressure arising in a cell-like cavity, such as a battery cell, having a cover which has a seal for sealing a housing opening up to a predetermined cell pressure and is provided with a holding device in order to hold the cover on the housing opening, the holding device has a spring clip which is attached to the lower face of the cover that faces the housing opening and has a plurality of radially outwardly directed spring tongues which, at the ends thereof, are provided with spring portions which, when the cover is pressed onto the housing opening, can be moved back resiliently in the radial direction through the opening edge and, after passing through the housing opening, snap back under a wall region around the opening edge.

This invention also relates to an assembly kit for constructing a pressure relief valve and a container having a cell-like cavity having such a pressure relief valve.

Discussion of Related Art

German Patent Reference DE 10 2016 121 605 A1 specifies a pressure relief valve which is used to reduce pressure arising in a cell-like cavity, such as a battery cell. The cover has a cover part which has a seal for sealing a housing opening up to a predetermined cell pressure and is provided with a holding device in order to hold the cover on the housing opening. An advantageous type of mounting which functions reliably is achieved by the holding device having a spring clip which is attached to the lower face of the cover part that faces the housing opening and has a plurality of radially outwardly directed spring tongues which, at the ends thereof, are provided with spring portions which, when the cover is pressed onto the housing opening, can be moved back resiliently in the radial direction through the opening edge and, after passing through the housing opening, snap back under a wall region around the opening edge.

A pressure relief valve is likewise specified in German Patent Reference DE 10 2014 111 041 A1. With this known pressure relief valve, a degassing valve is formed in particular in connection with a housing of a battery of a motor vehicle, a membrane of the degassing valve being pressed against a support element by a clamping frame with a predefined pressing force. In the case of a certain release force, the membrane detaches from the support element and releases a fluid channel between the interior of the housing and the surroundings of the housing. The degassing valve has at least one spring element in order to press the clamping frame in the direction of the support element. The degassing valve is fixed to an opening of the housing by a housing body and is attached to the housing by a nut.

A further pressure relief cover for a battery housing is disclosed in German Patent Reference DE 10 2013 016 668 A1. The pressure relief cover has a valve body and at least one spring element, the valve body being lifted against the spring force when the internal pressure in the battery housing rises and being moved into a closed position by the spring force when the internal pressure drops.

German Patent Reference DE 10 2015 011 663 A1 discloses a pressure relief valve in connection with an emergency degassing device, in which a housing opening is covered by a cover part which deforms under elevated pressure in the housing interior, and an adjustable display component is provided for displaying the deformation, which component is in contact with the cover part.

SUMMARY OF THE INVENTION

One problem addressed by this invention is that of providing a pressure relief valve of the type mentioned above, which can be assembled simply while functioning reliably and can be mounted on an opening of a cell-like cavity, such as a battery cell, the wall of which can have a different wall thickness, and providing an assembly kit for constructing such a pressure relief valve and a container having a cell-like hollow body protected against excessive pressure build-up.

This problem is solved by the features described in this specification and in the claims. In this case, a bearing device, which is separate from the cover prior to mounting and to which the spring clip is fixed by a support part, is connected to the cover on the lower face thereof that faces the housing opening, a connection adapter being connected to the center of the bearing device, a central opening of the spring clip being placed on the connection adapter and the support part being connected to the connection adapter, thus fixing the spring clip.

The pressure relief valve constructed in this way includes few parts and can be mounted simply on the opening of a cell-like cavity, such as a battery cell, by being pressed in from the outside. In particular, a simple adaptation to different wall thicknesses around the opening edge is possible with consistently good functionality. In accordance with the relevant wall thickness, only a bearing device which matches said thickness needs to be used and the other parts of the pressure relief valve can be kept unchanged. After having been fixed, the cover part with the seal can lift off from the outer face of the wall region around the opening edge when the internal pressure of the battery cell exceeds a predetermined pressure threshold, the pressure threshold being predeterminable by the spring force of the spring tongues. As long as the internal pressure of the battery cell is less than the predetermined pressure threshold or decreases again after a pressure reduction in the cell, the cover part with the seal is again pressed against the wall region around the opening edge by the spring force of the spring tongues. The pressure threshold can be set relatively low, such as below 1 bar, for example in the range of one tenth of a bar. In addition to battery or rechargeable battery cells, use is also possible in other cell-like cavities, such as a closed container in which pressure can build up, which then causes a risk of bursting, such as a storage container in an aircraft.

In an embodiment which is particularly advantageous for mounting, the connection adapter is designed such that the bearing device, the spring clip and the support part are oriented relative to one another in a fixed rotational position by the connection adapter. This ensures that the spring portions which are spaced apart from the lower face of the wall region around the opening edge are supported, with the spring tongues thereof, by the support part and the cover is held on the housing opening when gas escapes under excess pressure.

In an additional embodiment, which is particularly advantageous for mounting and function, the bearing device and the spring clip have a star shape in an axial plan view, having a number of 2n arms and 2n spring tongues, the connection adapter having a non-round shape in the axial plan view and the support part having a star shape having a number of n arms, where n is a positive integer. As a result, a clear rotational position of the bearing device, the spring clip and the support part relative to one another is predetermined.

An embodiment which is particularly advantageous for production includes that the connection adapter has an angular shape in the axial plan view, in particular having a number of n corners.

In one embodiment which is particularly advantageous for production and mounting, the bearing device and the connection adapter are formed in one piece with one another, or integrally bonded, such as by gluing or welding or latched or screwed together, and the connection adapter and the support part are latched or screwed together.

For mounting and function, the following measures are advantageous: the spring portions, in the longitudinal portion thereof extending in the radial direction, are recessed downward away from the cover in a U-shape, and in the mounted state of the pressure relief valve, the free edges of the radially outer U-legs of the spring portions each form a support surface engaging under the wall region around the housing opening. The U-shaped depression results in a free outer leg, which, during mounting, can be resiliently pivoted through the opening edge in a radially inward direction and then springs back in a radially outward direction.

One embodiment which is advantageous for construction and function includes at least some of the spring portions spaced from the lower face of the cover part to such an extent that, in the mounted state, the seal is held under pressure on the upper face of the wall region around the opening edge.

In a further embodiment, a further proportion of the spring portions is advantageously spaced apart from the lower face of the cover part to such an extent that, in the mounted state, the portions are spaced apart from the lower face of the wall region around the opening edge. This prevents the pressure relief valve from being inadvertently moved away from the region of the housing opening under excessive pressure. The ends of the additional spring portions that are further away from the lower face of the cover part, and therefore from the lower face of the wall region around the housing opening, result in an unhindered lifting of the cover part from the wall region around the opening when the predetermined pressure threshold is exceeded, but then prevent an unintentional complete removal of the pressure relief valve from the region of the opening.

In this case, one embodiment which is advantageous for the function includes that the spring tongues which are connected to the spring portions which are spaced further apart from the lower face of the cover part are supported and/or stiffened from below by a support part which is likewise attached to the lower face of the cover part. As a result, the spring tongues belonging to the further spring portions are blocked from pivoting back in a resilient manner.

An embodiment of this invention that is advantageous for the function provides that the spring clip is supported and positioned on bearing structures on the lower face of the bearing device, projections engaging in the depressions in the U-shaped spring portions and the bearing structures being designed such that the radially outer spring portions can be pivoted inward.

A further measure which is advantageous for mounting includes the cover equipped as a cover unit having two cover parts which are separate prior to the assembly of the cover, which unit has a first cover part on the lower face facing the housing opening and a second cover part, which is connected to the first cover part, on the upper face facing away from the housing opening.

An embodiment which is also advantageous for the function includes a gas-permeable, at least largely moisture-impermeable membrane arranged between the two cover parts.

In a further embodiment which is advantageous for mounting and function, the bearing device and/or the second cover part is releasably connected to the first cover part by latching or screwing or is non-releasably connected to the first cover part, in particular by welding or gluing.

An embodiment which is also advantageous for mounting provides that the membrane is glued or welded to the first cover part or that the membrane is held by the cover parts, for example by clamping.

In a further embodiment of this invention that is advantageous for the function, the membrane is connected to the first cover part in a fluid-tight manner in a radial outer region.

Another embodiment which is advantageous for the function provides that at least one flow path for the passage of gas is formed by at least one channel portion arranged between the cover parts, which with the interposition of the membrane, is connected to at least one opening to the cavity on one side and to the outside space around the cover on the other side.

In a particularly preferred embodiment, a plurality of channel portions are present and the channel portions are delimited on the upper face of the first cover part that faces away from the housing opening and/or on the lower face of the second cover part that faces the housing opening by depressions in the cover parts or by spacers which are arranged thereon and formed in one piece therewith and spacers which are arranged on the radial outer face of the first cover part and/or the second cover part and are formed in one piece therewith.

In addition, the subject matter of this invention includes an assembly kit for constructing a pressure relief valve, in which at least two bearing devices of different heights having connection adapters, at least one spring clip, at least one support part and at least one, optionally already assembled, cover are present.

In addition, one object of this invention is to provide a container comprising at least one cell-like cavity and at least one pressure relief valve designed in the manner described above.

BRIEF DESCRIPTION OF THE DRAWINGS

This invention is explained in more detail below on the basis of embodiments and with reference to the drawings, in which.

DETAILED DESCRIPTION OF INVENTION

Figure 1:
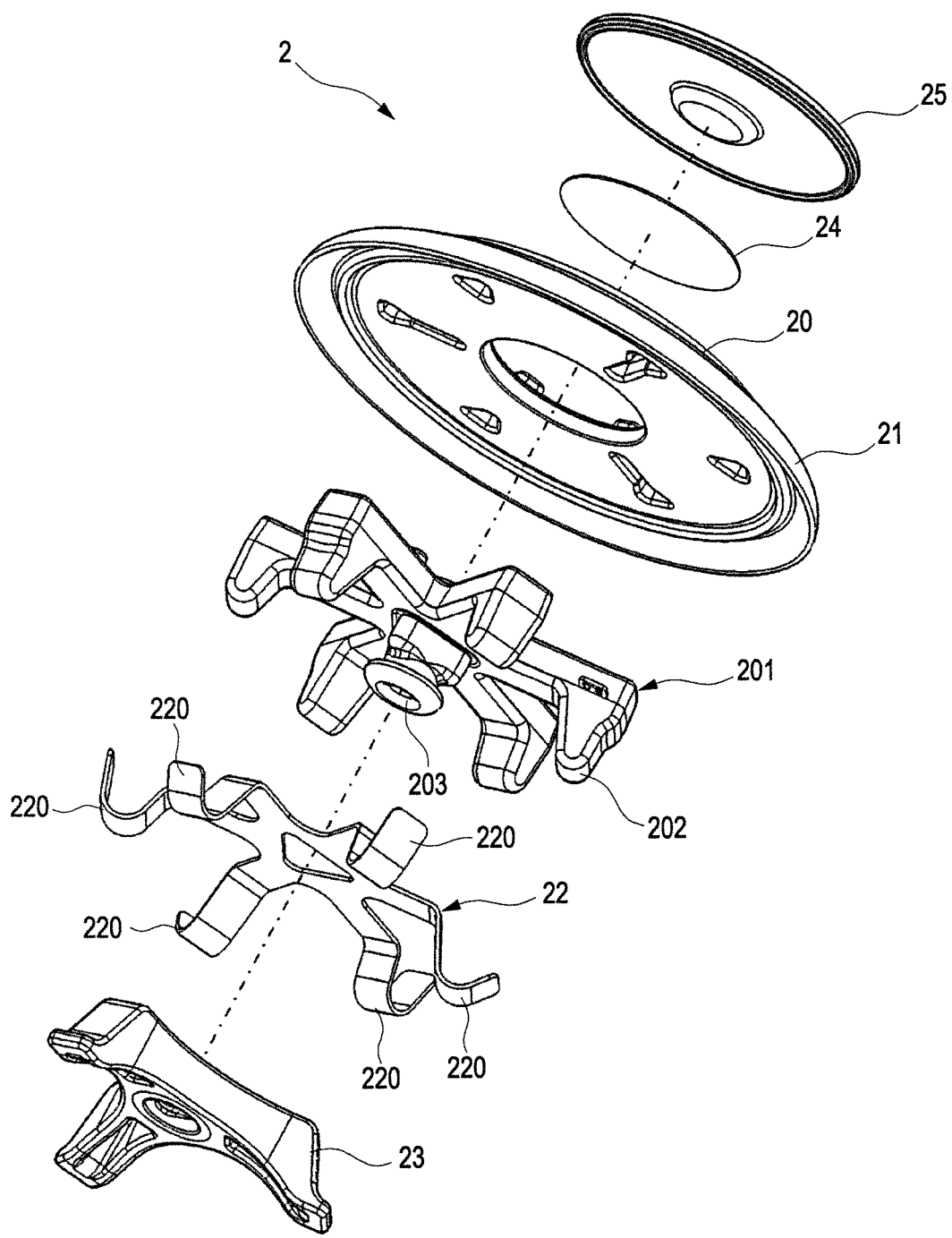
FIG. 1 is a perspective exploded view of a pressure relief valve.

FIG. 1 is a perspective exploded view of the pressure relief valve, which has a plurality of components: a multipart cover 2 having a first 20 and second 25 cover part and a gas-permeable, at least largely moisture-impermeable membrane 24 arranged between the two cover parts 20, 25, a separate storage device 201 having a connection adapter 203 connected thereto, a spring clip 22 and a support part 23.

Figure 2A:
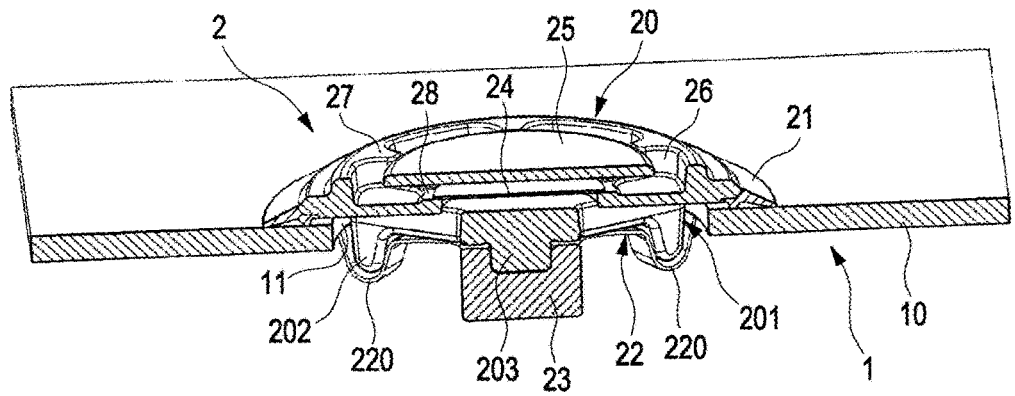
FIGS. 2a-2d are perspective sectional views of the pressure relief valve from FIG. 1 mounted in a housing opening.
Figure 2B:
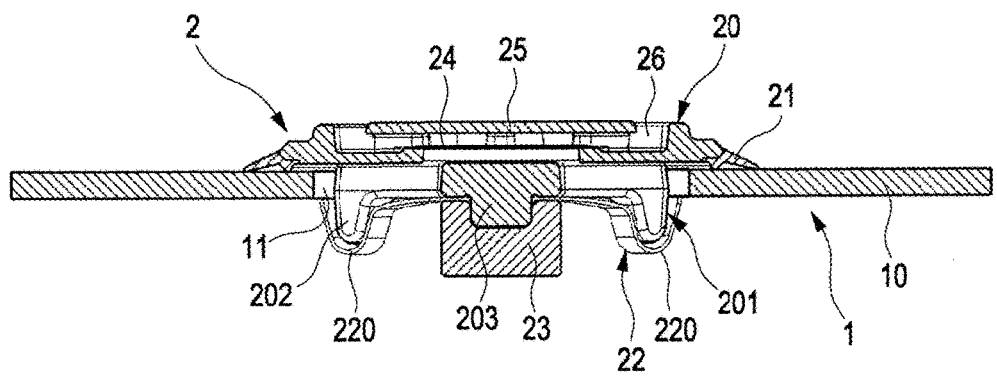
Figure 2C:
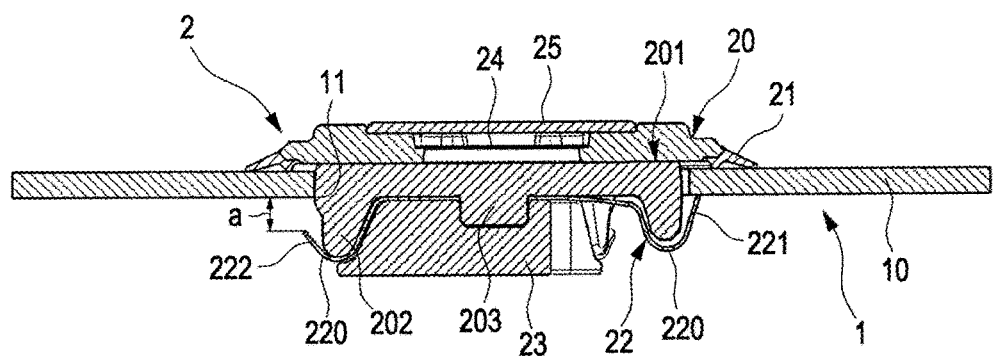
Figure 2D:
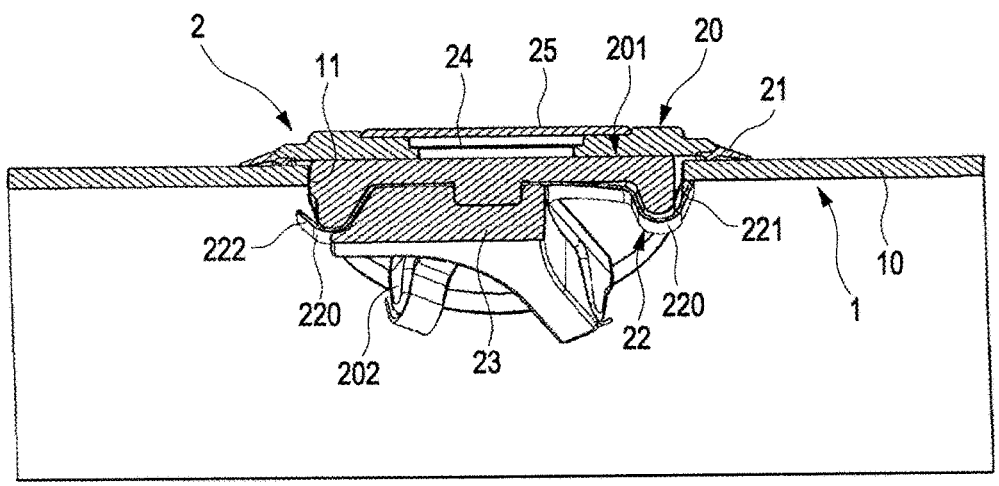

FIGS. 2a to 2d show a section of a housing 1 of a cell-like cavity, such as a battery cell, with a housing opening 11 introduced in a housing wall 10 and a pressure relief valve inserted in the housing opening 11, in a perspective view obliquely from above onto the housing wall 10 (FIG. 2a), a side view of the housing wall 10 (FIG. 2b), a side view rotated by 60°, for example, in comparison with FIG. 2b (FIG. 2c), and perspectively obliquely from the lower face or inside of the housing 1 (FIG. 2d).

The pressure relief valve in this case rests with the first cover part 20 on the upper face of the housing wall 10 around the edge of the housing opening 11 via a seal 21, the first cover part 20 being connected to a second cover part 25. During the manufacturing process or before the assembly of the cover 2, before the connection of the cover parts 20, 25, the membrane 24 is introduced between the cover parts 20, 25, the membrane being glued or welded to the first cover part 20 or held, for example clamped, by the cover parts 20, 25. The membrane 24 is advantageously connected to the first cover part 20 in a circumferential, fluid-tight manner in a radial outer region. At least one flow path for the passage of gas is formed by at least one channel portion 26 arranged between the cover parts 20, 25, the channel portion 26 being connected to at least one opening to the cavity on one side and to the outside space around the cover on the other side. A plurality of channel portions 26 which are offset from one another in the circumferential direction are preferably present. The channel portions 26 are, for example, delimited by spacers 27, 28 which are arranged on and formed in one piece with the upper face of the first cover part 20 that faces away from the housing opening 11, and/or the lower face of the second cover part 25 that faces the housing opening 11 and the radial outer face of the first cover part 20 and/or second cover part 25. The channel portions can also be delimited by depressions in the upper face of the first cover part 20 and/or in the lower face of the second cover part 25 and by spacers 27, 28 which are arranged on the radial outer face of the first cover part 20 and/or second cover part 25 and are integrally formed therewith, it being possible for the first 20 and second 25 cover part to also lie directly on top of one another.

The bearing device 201, which is separate from the cover prior to mounting, is connected to the face of the cover 2 that faces the housing opening 11, in particular to the first cover part 20 thereof, the connection adapter 203 being connected to the center of the bearing device 201. A central opening of the spring clip 22 placed on the connection adapter 203 and the support part 23 is connected to the connection adapter 203, thus fixing the spring clip 22, as a result of which the spring clip 22 arranged therebetween is fixed to the bearing device 201. In this case, the connection of the first cover part 20 to the storage device 201 is advantageously established either releasably, for example by latching or screwing, or non-releasably, for example by welding or gluing. It is particularly advantageous if the bearing device 201 and the connection adapter 203 are formed in one piece with one another or are latched or screwed together in the mounted state and the connection adapter 203 and the support part 23 are likewise latched or screwed together.

The spring clip 22, which preferably consists of or is of metal, has a plurality of radially outwardly extending spring tongues 220, specifically six in the embodiment shown. The end portions of the spring tongues transition into spring portions 221, 222 which are recessed downward in a U-shape, such as away from the cover 2, in particular the first cover part 20, the radially outer free spring legs or edges of which spring portions engage under the wall region around the opening edge of the housing opening 11 in the mounted state. Three of the spring tongues 220 are underpinned by the support part 23, such that they can practically not be deflected downward resiliently, while the remaining three elastic tongues 220 are downwardly exposed and can be resiliently deflected. In the embodiment shown, the spring tongues 220 are distributed at equal angular intervals in the circumferential direction, downwardly exposed spring tongues 220 alternating with spring tongues which are supported from below by the support part 23, such as an angular distance of 60 degrees results between the individual spring tongues 220 in the circumferential direction. More than six spring tongues 220 may also be provided, for example, which are alternately exposed and underpinned.

The U-shaped end portions of the spring tongues 220 underpinned or uncovered by the support part 23 are exposed as well, such that the radially outer U-legs can pivot inward when the pressure relief valve is pressed from above into the housing opening 11, the outer circumference around the radially outer U-legs being slightly larger in the region of the free ends thereof than the circumference of the housing opening 11 which is to be associated. Furthermore, the free ends of the radially outer U-legs of the spring portions 221, 222 are so far away from the lower face of the cover part 20 and the seal 21 resting thereon that the outer legs, after passing through the housing opening 11 at the lower face of the wall region, can snap back around the opening edge.

Figure 3:
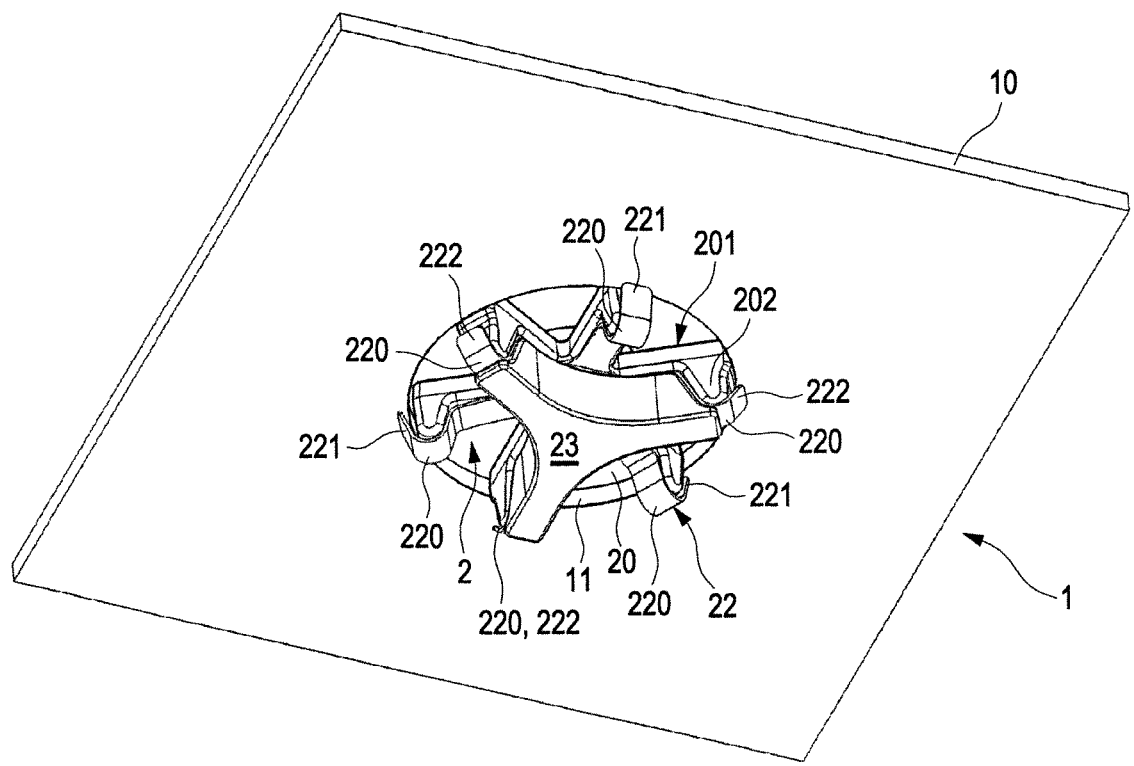
FIG. 3 is a perspective plan view of the lower face of the housing opening with the mounted pressure relief valve from FIG. 1.

As shown in more detail from FIGS. 2c, 2d and 3, the distance between the free ends of the outer U-legs and the lower face of the first cover part 20 is smaller in the case of the unsupported spring tongues 220 than in the case of the spring tongues 220 supported by the support part 23. This means that the U-legs of the unsupported spring tongues 220 form long spring portions 221 and the outer U-legs of the supported spring tongues 220 form short spring portions 222. The long spring portions 221 are dimensioned such that, in the case of the pressed state of the cover part 20 and a slightly compressed seal 21, the free ends of the long spring portions 221 that are formed as support surfaces are supported under tension on the lower face of the wall region around the opening edge of the housing opening 11. In order to snap the long spring portions 221 under the wall region around the opening edge, the first cover part 20 is pressed against the upper face or outer face of the wall region around the opening edge until the seal 21 consisting of or including a resilient material is deformed enough to then expand again and maintain sufficient tension to fulfill its sealing function.

By contrast, in the inserted state of the pressure relief valve, the free end region of the short spring portions 222 is spaced apart from the lower face of the wall region around the opening edge by a distance a (FIG. 2c). In the case of an internal cell pressure which exceeds the pressure threshold predetermined by the exposed spring tongues 220, the cover 2 or the first cover part 20 with the seal 21 lifts off from the upper face of the wall region around the housing opening 11, such that the internal pressure in the cell interior decreases. In order to ensure that the pressure relief valve 2 is not moved out of the region of the housing opening 11, the short spring portions 222 are provided which ensure a sufficient distance a from the lower wall region around the opening edge, such that, even in the case of a high internal pressure of the cell, a reliable pressure reduction is ensured by a correspondingly large ventilation gap, but also such that the cover is held in the region of the housing opening 11, since the spring tongues 220 belonging to the short spring portions 222 are prevented from resiliently pivoting back downward by the support part 23, and are thus supported and/or stiffened by said support part.

The spring clip 22 is advantageously supported, and thus also positioned, on bearing structures 202 on the lower face of the bearing device 201, projections engaging in the depressions of the U-shaped spring portions 221, 222, but sufficient clearance being provided for the radially outer U-legs to pivot inward. As shown in FIGS. 2a to 2d and 3, the central opening of the spring clip 22 is arranged on the connection adapter 203 arranged in the center of the bearing device 201, and the spring clip is connected to the adapter by the relatively rigid support part 23.

The connection adapter 203 is also designed such that the bearing device 201, the spring clip 22 and the support part 23 are oriented relative to one another in a fixed rotational position by the connection adapter. The bearing device 201 and the spring clip 22 advantageously have a star shape in an axial plan view, having a number of 2n arms and 2n spring tongues 220, the connection adapter 203 having a non-round shape in the axial plan view and the support part 23 having a star shape having a number of n arms, where n is a positive integer. The connection adapter 203 can, for example, have a shape which is angular, oval or provided with a projection, such that a clear rotational position of the aforementioned parts relative to one another is ensured. An embodiment in which the connection adapter 203 has an angular shape in an axial plan view, having a number of n corners, is particularly advantageous.

Figure 4:
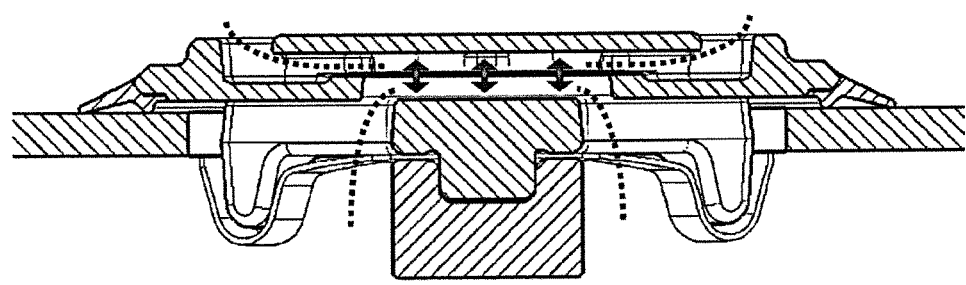
FIG. 4 is a sectional view of the pressure relief valve from FIG. 1 inserted into a housing opening, showing the gas exchange through the membrane.

FIG. 4 schematically shows the gas exchange which is made possible by the membrane 24 below the pressure threshold of the pressure relief valve, that is to say when the cover 2 has not been lifted off. Moisture or other fine foreign particles cannot penetrate the cell through the membrane 24. When the pressure relief valve is triggered, such penetration is also at least largely prevented by the excess pressure of the gas flowing out of the cell between the seal 21 and the housing opening 11.

The design described above and shown in the drawings results in an advantageous type of mounting which functions reliably.

By using at least two bearing devices 201 and/or possibly connection adapters 203 of different heights, the pressure relief valve can advantageously be constructed and used in modular form as an assembly kit for different wall thicknesses of the housing wall around the housing opening 11, which kit additionally comprises at least one spring clip 22, at least one support part 23 and the cover 2, which is optionally already assembled.

The pressure relief valve is used in a container comprising at least one cell-like cavity, in particular a battery or rechargeable battery. In addition to battery or accumulator cells, use is also possible in other cell-like cavities, such as a closed container in which a pressure can build up and which causes a risk of bursting, such as a storage container in an aircraft.

The invention claimed is:

1. A pressure relief valve for reducing pressure arising in a cavity of a cell, comprising:
   a cover (2) which has a seal (21) for sealing a housing opening (11) up to a predetermined cell pressure and has a holding device to hold said cover on the housing opening (11),
   wherein the holding device has a spring clip (22) attached to the lower face of the cover (2) that faces the housing opening (11) and has a plurality of radially outwardly directed spring tongues (220) which at the ends thereof have spring portions (221, 222) which, when the cover (2) is pressed onto the housing opening (11), can be moved back resiliently in the radial direction through the opening edge, and, after passing through the housing opening, snap back under a wall region around the opening edge,
   a bearing device (201), which is separate from the cover prior to mounting and to which the spring clip (22) is fixed by a support part (23), the bearing device (201) being connected to the cover (2) on the lower face thereof that faces the housing opening (11), and
   a connection adapter (203) connected to the center of the bearing device (201), wherein a central opening of the spring clip (22) is placed on the connection adapter (203) and the support part (23) is connected to the connection adapter (203), thus fixing the spring clip (22), and
   wherein the cover (2) is equipped as a cover unit having two cover parts (20, 25) which are separated prior to the assembly of said cover, which unit has a first cover part (20) on the lower face facing the housing opening (11) and a second cover part (25), which is connected to the first cover part (20), on the upper face facing away from the housing opening (11).

2. The pressure relief valve according to claim 1, wherein the connection adapter (203) is designed such that the bearing device (201), the spring clip (22) and the support part (23) are oriented relative to one another in a fixed rotational position by said connection adapter.

3. The pressure relief valve according to claim 2, wherein the bearing device (201) and the spring clip (22) have a star shape in an axial plan view of the pressure relief valve, having a number of 2n arms and 2n spring tongues (220), the connection adapter (203) has a non-round shape in the axial plan view and the support part (23) has a star shape having a number of n arms, where n is a positive integer.

4. The pressure relief valve according to claim 3, wherein the connection adapter (203) has a shape which is angular in the axial plan view, having a number of n corners.

5. The pressure relief valve according to claim 4, wherein the bearing device (201) and the connection adapter (203) are formed in one piece with one another or integrally bonded or latched or screwed together, and the connection adapter (203) and the support part (23) are latched or screwed together.

6. The pressure relief valve according to claim 5, wherein the spring portions (221, 222), in the longitudinal portion thereof extending in the radial direction, are recessed downward away from the cover (2) in a U-shape and in the mounted state of the pressure relief valve, the free edges of the radially outer U-legs of the spring portions (221, 222) each form a support surface engaging under the wall region around the housing opening (11).

7. The pressure relief valve according to claim 6, wherein at least some of the spring portions (221) are spaced apart from the lower face of the cover (2) to such an extent that, in the mounted state, the seal (21) is held under pressure on the upper face of the wall region around the opening edge.

8. The pressure relief valve according to claim 7, wherein a further proportion of the spring portions (222) is spaced apart from the lower face of the cover part (2) to such an extent that, in the mounted state, said spring portions are spaced apart from the lower face of the wall region around the opening edge.

9. The pressure relief valve according to claim 8, wherein the spring tongues (220) which are connected to the spring portions (222) which are spaced further apart from the lower face of the cover (2) are supported and/or stiffened from below by the support part (23).

10. The pressure relief valve according to claim 9, wherein the spring clip (22) is supported and positioned on bearing structures (202) on the lower face of the bearing device (201), projections engaging in the depressions in the U-shaped spring portions (221, 222) and the bearing structures being designed such that the radially outer spring portions (221, 222) can be pivoted inward.

11. The pressure relief valve according to claim 1, wherein the bearing device (201) and the spring clip (22) have a star shape in an axial plan view of the pressure relief valve, having a number of 2n arms and 2n spring tongues (220), the connection adapter (203) has a non-round shape in the axial plan view and the support part (23) has a star shape having a number of n arms, where n is a positive integer.

12. The pressure relief valve according to claim 1, wherein the connection adapter (203) has a shape which is angular in an axial plan view, having a number of n corners.

13. The pressure relief valve according to claim 1, wherein the bearing device (201) and the connection adapter (203) are formed in one piece with one another or integrally bonded or latched or screwed together, and the connection adapter (203) and the support part (23) are latched or screwed together.

14. The pressure relief valve according to claim 1, wherein the spring portions (221, 222), in the longitudinal portion thereof extending in the radial direction, are recessed downward away from the cover (2) in a U-shape and in the mounted state of the pressure relief valve, the free edges of the radially outer U-legs of the spring portions (221, 222) each form a support surface engaging under the wall region around the housing opening (11).

15. The pressure relief valve according to claim 1, wherein at least some of the spring portions (221) are spaced apart from the lower face of the cover (2) to such an extent that, in the mounted state, the seal (21) is held under pressure on the upper face of the wall region around the opening edge.

16. The pressure relief valve according to claim 1, wherein a further proportion of the spring portions (222) is spaced apart from the lower face of the cover part (2) to such an extent that, in the mounted state, said spring portions are spaced apart from the lower face of the wall region around the opening edge.

17. The pressure relief valve according to claim 1, wherein the spring tongues (220) which are connected to the spring portions (222) which are spaced further apart from the lower face of the cover (2) are supported and/or stiffened from below by the support part (23).

18. The pressure relief valve according to claim 1, wherein the spring clip (22) is supported and positioned on bearing structures (202) on the lower face of the bearing device (201), projections engaging in the depressions in the U-shaped spring portions (221, 222) and the bearing structures being designed such that the radially outer spring portions (221, 222) can be pivoted inward.

19. Assembly kit for constructing a pressure relief valve according to claim 1, wherein at least two bearing devices (201) of different heights having connection adapters (203), at least one spring clip (22), at least one support part (23) and at least one assembled cover (2), are present.

20. A container comprising at least one cell cavity, in particular a battery or a rechargeable battery, having at least one pressure relief valve according to claim 1.

21. A pressure relief valve for reducing pressure arising in a cavity of a cell, comprising:
   a cover (2) which has a seal (21) for sealing a housing opening (11) up to a predetermined cell pressure and has a holding device to hold said cover on the housing opening (11),
   the holding device having a spring clip (22) attached to the lower face of the cover (2) that faces the housing opening (11) and has a plurality of radially outwardly directed spring tongues (220) which, at the ends thereof have spring portions (221, 222) which, when the cover (2) is pressed onto the housing opening (11), can be moved back resiliently in the radial direction through the opening edge,
   wherein after passing through the housing opening snap back under a wall region around the opening edge, a bearing device (201), which is separate from the cover prior to mounting and to which the spring clip (22) is fixed by a support part (23), is connected to the cover (2) on the lower face thereof that faces the housing opening (11),
   wherein a connection adapter (203) is connected to the center of the bearing device (201), a central opening of the spring clip (22) is placed on the connection adapter (203), the support part (23) is connected to the connection adapter (203), thus fixing the spring clip (22), and
   wherein the cover (2) is equipped as a cover unit having two cover parts (20, 25) which are separated prior to the assembly of said cover, which unit has a first cover part (20) on the lower face facing the housing opening (11) and a second cover part (25), which is connected to the first cover part (20), on the upper face facing away from the housing opening (11),
   wherein the connection adapter (203) is designed such that the bearing device (201), the spring clip (22) and the support part (23) are oriented relative to one another in a fixed rotational position by said connection adapter,
   wherein the bearing device (201) and the spring clip (22) have a star shape in an axial plan view of the pressure relief valve, having a number of 2n arms and 2n spring tongues (220), the connection adapter (203) has a non-round shape in the axial plan view and the support part (23) has a star shape having a number of n arms, where n is a positive integer,
   wherein the connection adapter (203) has a shape which is angular in the axial plan view, having a number of n corners
   wherein the bearing device (201) and the connection adapter (203) are formed in one piece with one another or integrally bonded or latched or screwed together, and the connection adapter (203) and the support part (23) are latched or screwed together,
   wherein the spring portions (221, 222), in the longitudinal portion thereof extending in the radial direction, are recessed downward away from the cover (2) in a U-shape and in the mounted state of the pressure relief valve, the free edges of the radially outer U-legs of the spring portions (221, 222) each form a support surface engaging under the wall region around the housing opening (11), wherein at least some of the spring portions (221) are spaced apart from the lower face of the cover (2) to such an extent that, in the mounted state, the seal (21) is held under pressure on the upper face of the wall region around the opening edge, wherein a further proportion of the spring portions (222) is spaced apart from the lower face of the cover part (2) to such an extent that, in the mounted state, said spring portions are spaced apart from the lower face of the wall region around the opening edge, wherein the spring tongues (220) which are connected to the spring portions (222) which are spaced further apart from the lower face of the cover (2) are supported and/or stiffened from below by the support part (23), wherein the spring clip (22) is supported and positioned on bearing structures (202) on the lower face of the bearing device (201), projections engaging in the depressions in the U-shaped spring portions (221, 222) and the bearing structures being designed such that the radially outer spring portions (221, 222) can be pivoted inward, and wherein the cover (2) is equipped as a cover unit having two cover parts (20, 25) which are separated prior to the assembly of said cover, which unit has a first cover part (20) on the lower face facing the housing opening (11) and a second cover part (25), which is connected to the first cover part (20), on the upper face facing away from the housing opening (11).

22. The pressure relief valve according to claim 21, wherein a gas-permeable, at least largely moisture-impermeable membrane (24) is arranged between the two cover parts (20, 25).

23. The pressure relief valve according to claim 22, wherein the bearing device (201) and/or the second cover part (25) is releasably latched or screwed or non-releasably connected, in particular welded or glued, to the first cover part (20).

24. The pressure relief valve according to claim 22, wherein the membrane (24) is glued or welded to the first cover part (20) or the membrane (24) is held by the cover parts (20, 25).

25. The pressure relief valve according to claim 24, wherein the membrane (24) is connected to the first cover part (20) in a fluid-tight manner in a radial outer region.

26. The pressure relief valve according to claim 25, wherein at least one flow path for the passage of gas is formed by at least one channel portion (26) arranged between the cover parts (20, 25), and is connected to at least one opening to the cavity on one side and to the outside space around the cover (2) on the other side.

27. The pressure relief valve according to claim 26, wherein a plurality of channel portions (26) is present and the channel portions (26) are delimited on the upper face of the first cover part (20) that faces away from the housing opening (11) and/or on the lower face of the second cover part (25) that faces the housing opening (11) by depressions in the cover parts (20, 25) or by spacers (28) which are arranged thereon and formed in one piece therewith and spacers (27) which are arranged on the radial outer face of the first cover part (20) and/or the second cover part (25) and are formed in one piece therewith.

28. The pressure relief valve according to claim 21, wherein the bearing device (201) and/or the second cover part (25) is releasably latched or screwed or non-releasably connected, welded or glued, to the first cover part (20).

29. The pressure relief valve according to claim 22, wherein the membrane (24) is connected to the first cover part (20) in a fluid-tight manner in a radial outer region.

30. The pressure relief valve according to claim 21, wherein at least one flow path for the passage of gas is formed by at least one channel portion (26) arranged between the cover parts (20, 25), and is connected to at least one opening to the cavity on one side and to the outside space around the cover (2) on the other side.

\* \* \* \* \*